United States Patent [19]
Ohtake

[11] Patent Number: 5,796,527
[45] Date of Patent: Aug. 18, 1998

[54] SMALL ZOOM OPTICAL SYSTEM

[75] Inventor: Motoyuki Ohtake, Kawasaki, Japan

[73] Assignee: Nikon Corporation, Tokyo, Japan

[21] Appl. No.: 660,197

[22] Filed: Jun. 3, 1996

[30] Foreign Application Priority Data

Jun. 19, 1995 [JP] Japan ................................ 7-175530

[51] Int. Cl.⁶ ........................ G02B 15/14; G02B 3/02
[52] U.S. Cl. ................................... 359/692; 359/714
[58] Field of Search ................................ 359/692, 714

[56] References Cited

U.S. PATENT DOCUMENTS 5,541,772  7/1996  Lin ............................................ 359/692

FOREIGN PATENT DOCUMENTS

A-2-73322    3/1990  Japan.
A-3-127009   5/1991  Japan.
A-5-257063  10/1993  Japan.
A-6-130298   5/1994  Japan.

*Primary Examiner*—David C. Nelms
*Assistant Examiner*—Evelyn A. Lester
*Attorney, Agent, or Firm*—Oliff & Berridge, P.L.C.

[57] ABSTRACT

A small, high performance zoom optical system has a simple structure that includes a positive lens group having a positive refractive power and a negative lens group having a negative refractive power arranged on an image side of the positive lens group. The positive lens group includes, in order from an object side, a first lens component with a negative refractive power, a second lens component with a negative refractive power and a third lens component with a positive refractive power. The first lens component has a meniscus shape with a concave surface facing the object side. Zooming is performed by changing the distance between the positive lens group and the negative lens group.

17 Claims, 12 Drawing Sheets

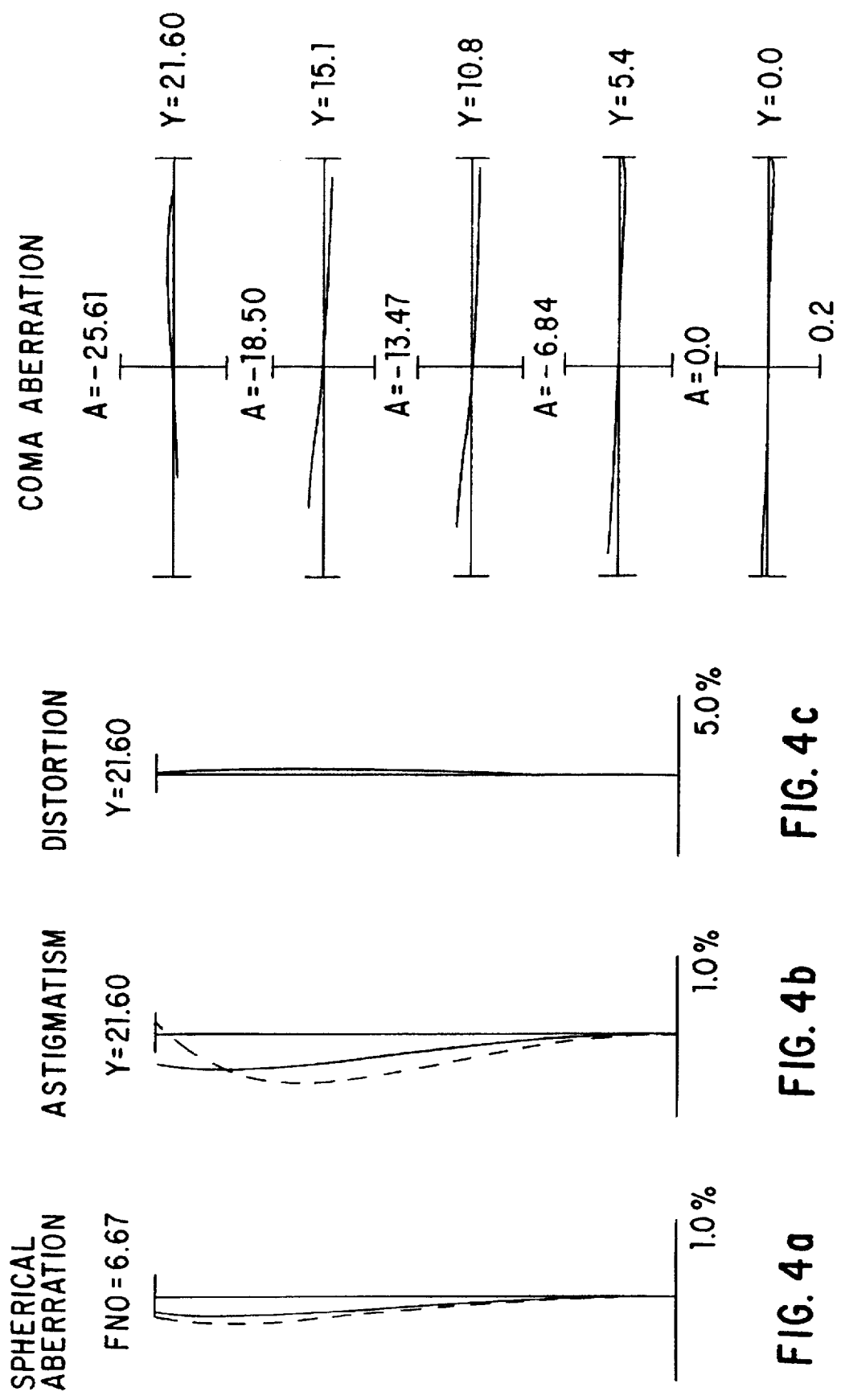

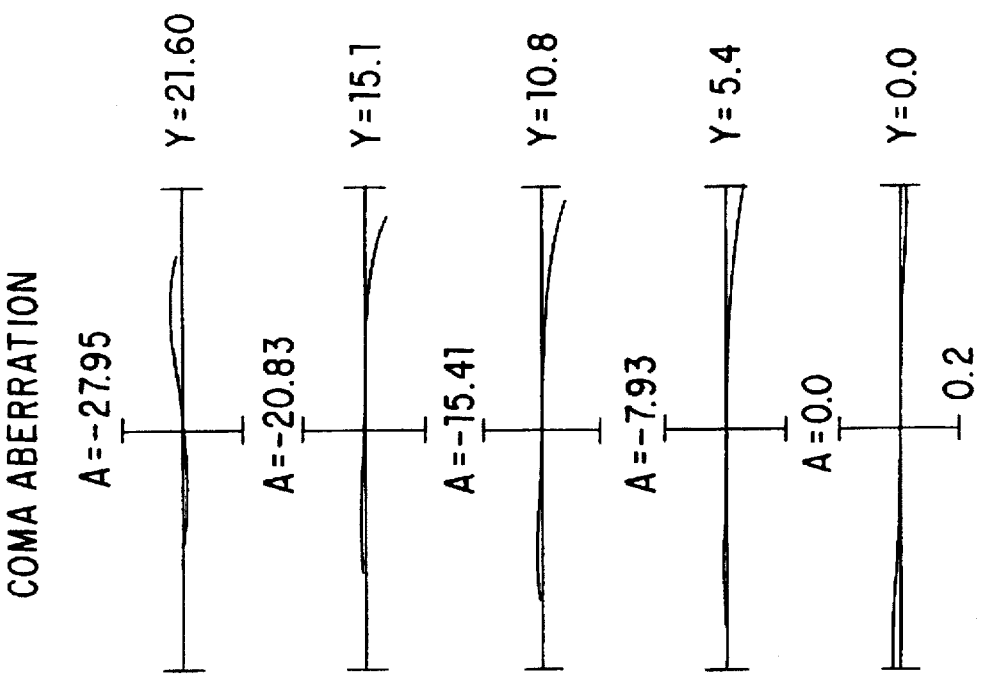

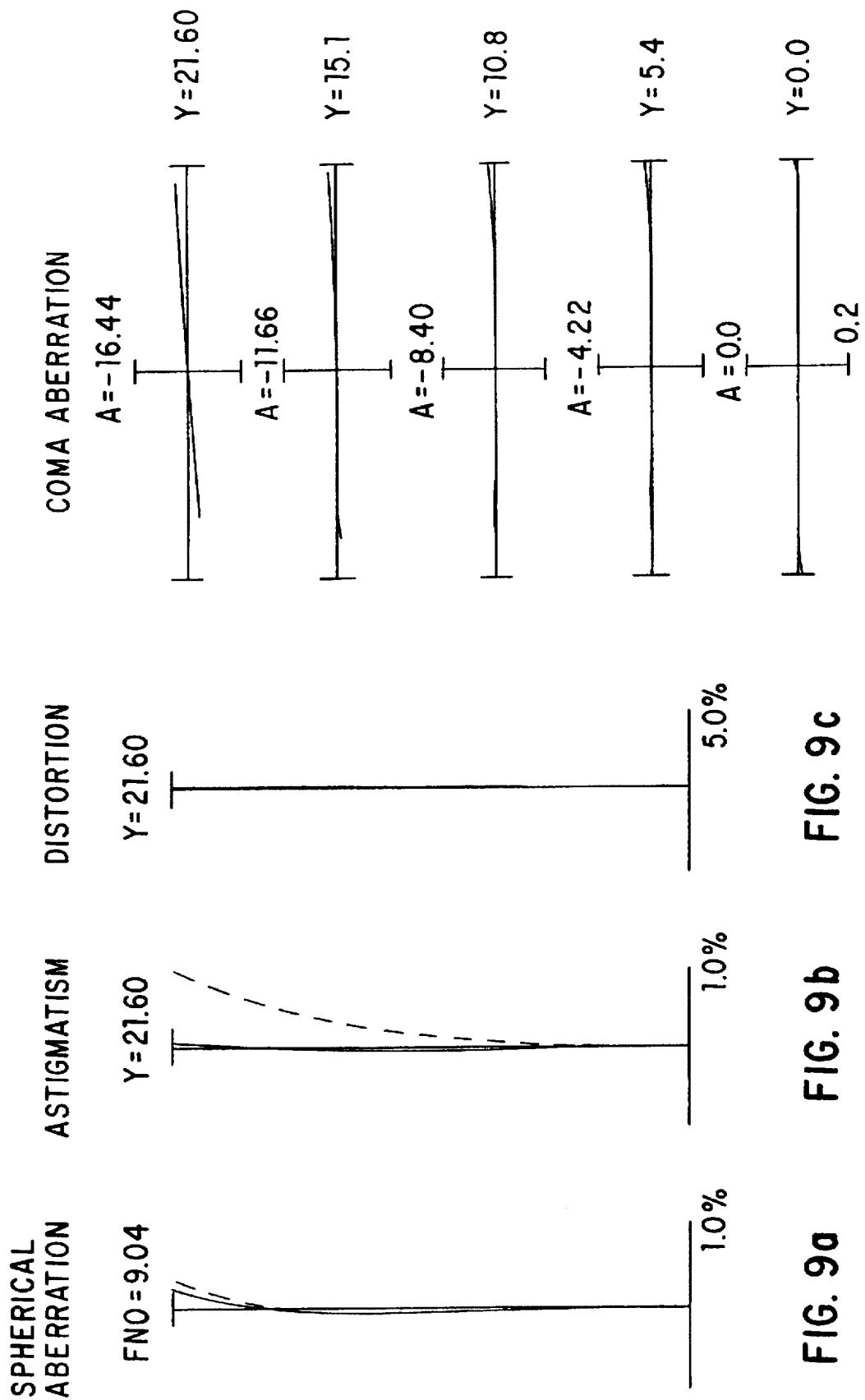

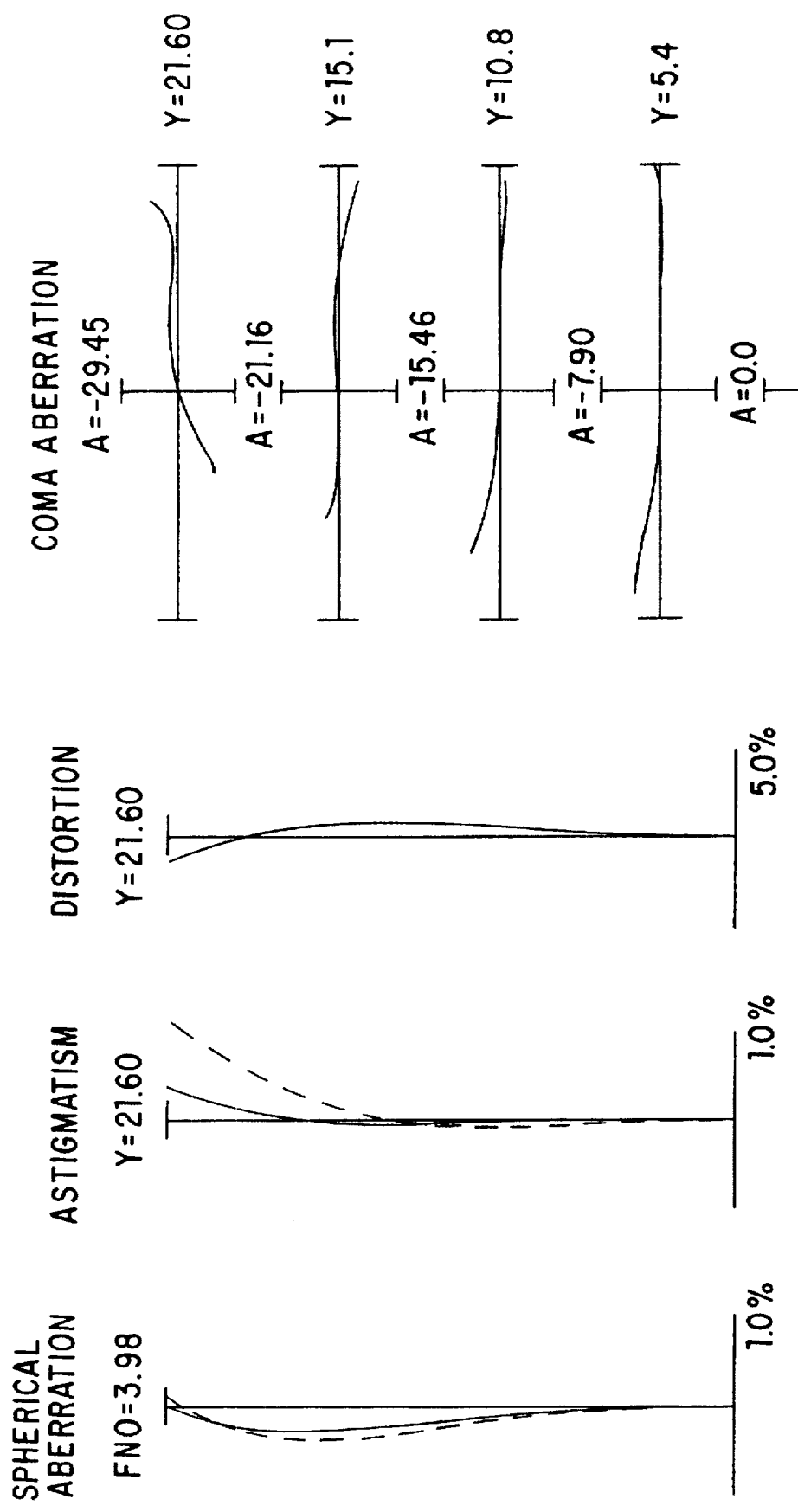

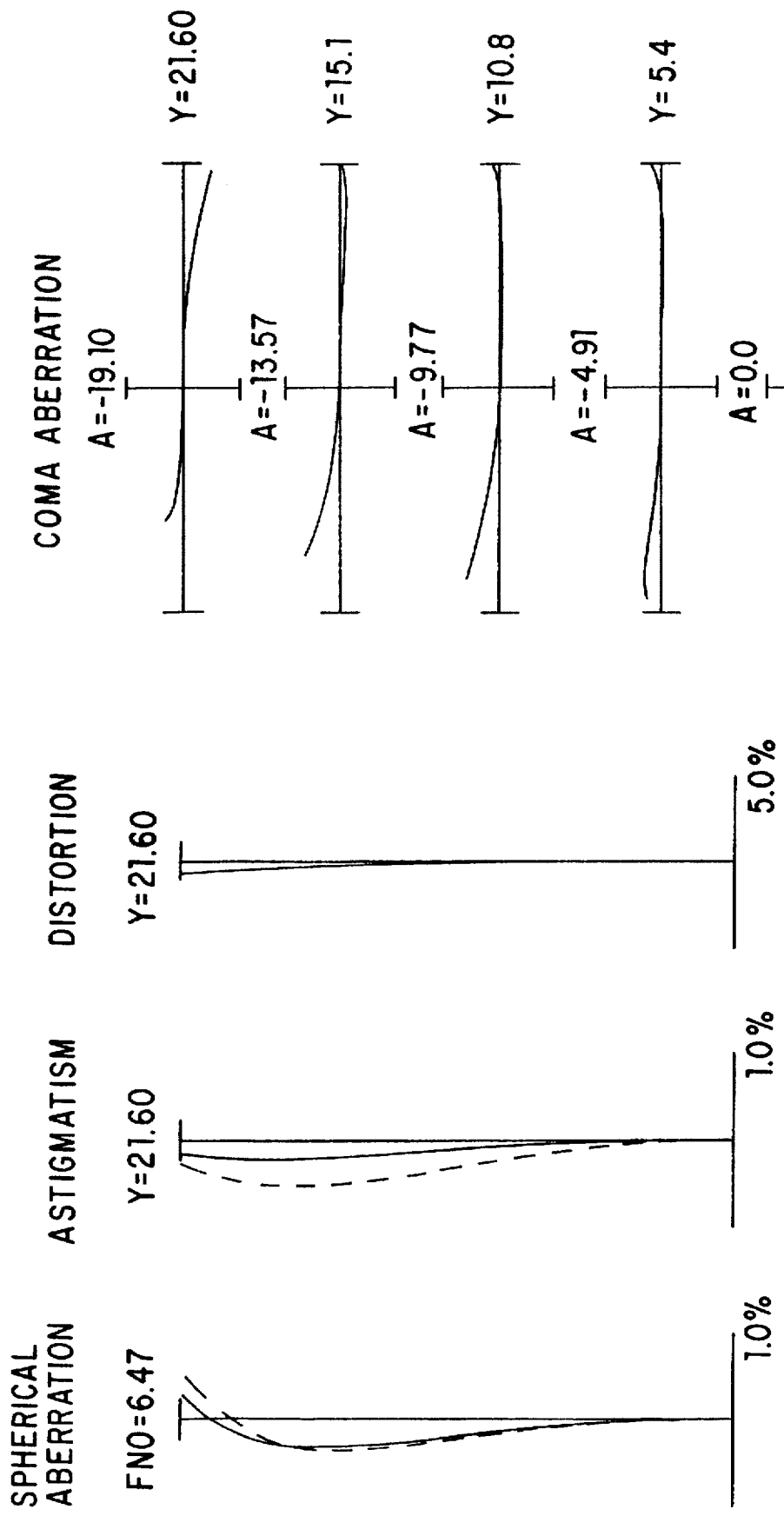

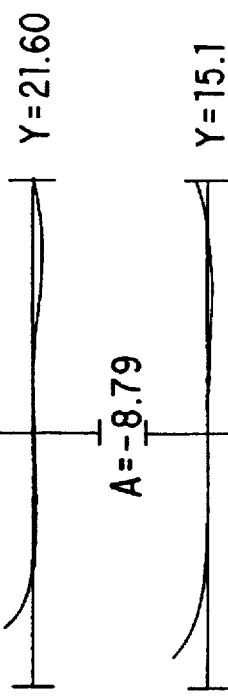
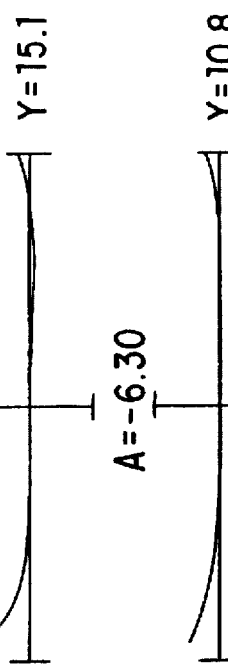
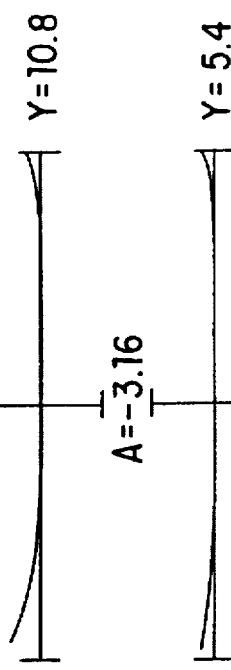
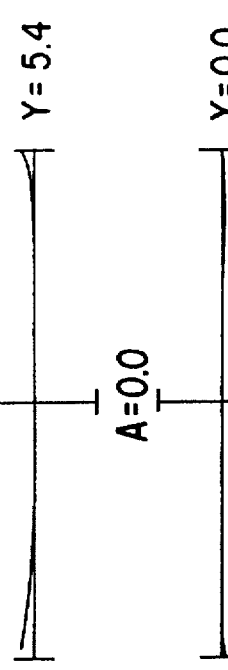
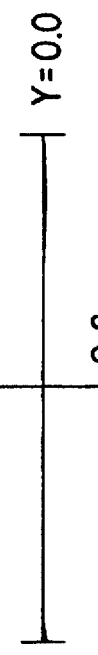
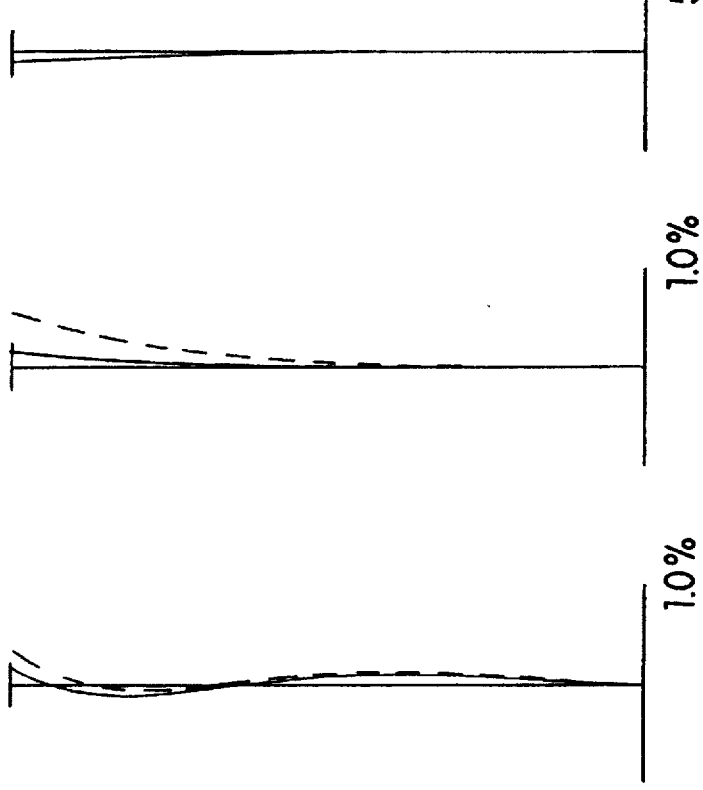
FIG. 13a  FIG. 13b  FIG. 13c  FIG. 13d

SMALL ZOOM OPTICAL SYSTEM

BACKGROUND OF THE INVENTION

1. Field of the Invention

The invention relates to a small zoom optical system, and more particularly, to a small zoom optical system suitable for a lens shutter type camera.

2. Description of Related Art

Zoom lenses have become mainstream in recent years as the objective lens for lens shutter type cameras. Various proposals have been made concerning positive-negative two group zoom lenses having a simple lens system structure.

A positive-negative two group zoom lens is formed of a positive lens group and a negative lens group that is arranged on an image side of the positive lens group. The focal length of the entire lens system is changed (zooming) by changing a distance between the positive lens group and the negative lens group. An example of one such positive-negative two group zoom lens is disclosed in Japanese Laid-Open Patent Publication No. 2-73322.

As zoom lenses become more common, various proposals have been made in an attempt to miniaturize the zoom lens and to reduce costs. For example, in Japanese Laid-Open Patent Publication No. 3-127009 and in Japanese Laid-Open Patent Publication No. 5-257063, lens systems are disclosed that aim to reduce costs while securing a predetermined zoom ratio. In these disclosed lens systems, cost reduction is attempted by reducing the number of lenses in the lens system or by using plastic material for the lens.

In general, plastic material has a lower fusing point than glass material. Hence, molding is easier and a reduction in manufacturing costs may be achieved.

In the lens system disclosed in Japanese Laid-Open Patent Publication No. 3-127009, the positive lens group is formed of a negative lens and a positive lens. The object side surface of the negative lens performs a convergence operation and the image side surface performs a divergence operation. By making both surfaces of the negative lens aspherical in shape, on-axis aberrations and off-axis aberrations are corrected. Furthermore, the number of lenses in the system is reduced by forming the negative subgroup with one lens.

However, with the lens system disclosed in Japanese Laid-Open Patent Publication No. 3-127009, the object side surface of the negative lens in the positive lens group has a strong positive refractive power while the image side surface has a strong negative refractive power, and both surfaces are aspherical. In an aspherical surface, the curvature varies with the height from the optical axis, and performance deterioration caused by decentering that occurs during manufacturing is extremely noticeable.

The lens system disclosed in Japanese Laid-Open Patent Publication No. 5-257063, on the other hand, aims to reduce costs by using one each of a plastic lens for the positive lens group and the negative lens group.

With the lens system in Japanese Laid-Open Patent Publication No. 5-257063, cost reduction is sought by introducing plastic lenses. However, because the positive lens group is formed of four lenses, it is not satisfactory from the point of view of reducing the number of lenses in the system. Moreover, because the lens that is arranged closest to the object side has a convex surface facing the object side, correction of positive distortion aberration is not sufficient at a maximum wide-angle state.

In the lens system disclosed in Japanese Laid-Open Patent Publication No. 6-130298, which was filed by applicant, the positive lens group is formed of three lenses, and by using one each of a plastic lens for the positive lens group and for the negative lens group, cost reduction and reduction in number of lenses in the lens system are achieved. However, similar to the lens system of Japanese Laid-Open Patent Publication No. 3-127009, because a negative lens having aspherical surfaces on both sides is arranged in the positive lens group, performance deterioration caused by decentering that occurs during manufacturing is extremely noticeable.

Considering the problems described above, the invention aims to provide a small, high performance zoom optical system having a simple structure.

SUMMARY OF THE INVENTION

In order to resolve the problems described above, a small zoom optical system is provided that includes a positive lens group Gp having a positive refractive power and a negative lens group Gn having a negative refractive power that is arranged on the image side of the positive lens group Gp. The positive lens group Gp comprises, in order from the object side, a first lens component L1 having a negative refractive power, a second lens component L2 having a negative refractive power and a third lens component L3 having a positive refractive power, wherein the first lens component L1 comprises a meniscus shape having a concave surface facing the object side. Zooming is executed by changing the distance between the positive lens group Gp and the negative lens group Gn. The above structure results in an economical, small and high performance zoom optical system.

A preferred embodiment of the invention satisfies the conditions:

$$-0.7 < (r1-r2)/(r1+r2) < -0.1$$

where r1 is the radius of curvature of the object side surface of the first lens component L1 and r2 is the radius of curvature of the image side surface of the first lens component L1.

In a positive-negative two group zoom lens, in general, the distance between the positive lens group and the negative lens group is reduced during zooming from the maximum wide-angle state to the maximum telephoto state. An aperture stop is provided between the positive lens group and the negative lens group. The aperture stop can be moved jointly with or independent of the positive lens group.

In a positive-negative two group zoom lens, the refractive power distribution can become extremely asymmetrical between both sides of the aperture stop when approaching the maximum wide-angle state. Hence, positive distortion tends to increase and it becomes necessary to control each positive distortion generated in the positive lens group and in the negative lens group. Moreover, at the maximum wide-angle state, a sufficient back focus is hard to obtain and the off-axis light ray passing through the lens component that is away from the aperture stop moves away from the optical axis, tending to cause the lens system to become large.

Therefore, preferably the positive lens group Gp is formed of a negative subgroup arranged on the object side and a positive subgroup arranged on the image side so as to generate a negative distortion in the positive lens group Gp and to secure sufficient back focus.

There is an example of a prior art positive-negative two group zoom lens that is suitable for a lens shutter camera and that includes a positive lens group formed of a negative subgroup arranged on the object side and a positive subgroup arranged on the image side. However, in the zoom lens disclosed in Japanese Laid-Open Patent Publication No. 2-73322, for example, the negative subgroup is formed of a positive lens component and a cemented negative lens component, which results in the inconvenience of having many pieces of lenses in the system.

As described above, in the zoom lens disclosed in Japanese Laid-Open Patent Publication No. 3-127009, the negative subgroup is formed of one negative lens and surfaces of both sides of the negative lens are formed into an aspherical surface. In such a case, the inconvenience of performance deterioration due to decentering during manufacture is too large.

Hence, with the preferred embodiments, performance deterioration due to decentering is controlled well by forming the negative subgroup with two lens components. In particular, a positive distortion is corrected favorably by providing an aspherical surface in the negative subgroup.

When the negative subgroup is formed of a positive lens and a negative lens as in the prior art, the position of the principal point of the negative subgroup is shifted towards the image side. Hence, if the refractive power of the positive lens group is predetermined, the distance between the principal point of the negative subgroup and the principal point of the positive subgroup becomes too short. As a result, refractive powers of the two subgroups become mutually too strong and performance deterioration due to mutual decentering becomes too large. Further, the object side surface of the negative lens is responsible for virtually all the refractive power of the negative subgroup and, because the convex surface having large curvature is facing the aperture diaphragm, a large off-axis aberration is generated.

Hence, in the preferred embodiments, the position of the principal point of the negative subgroup is shifted towards the object side to weaken the refractive powers of the negative subgroup and the positive subgroup by forming the negative subgroup with two pieces of negative lenses. Thus, the performance deterioration due to mutual decentering is controlled.

Moreover, a negative distortion is favorably generated by making the first lens component L1 in the positive lens group Gp a meniscus shape with the concave surface facing the object side. Thus, a favorable imaging performance is obtained even at the maximum wide-angle state.

The distance between the positive lens group Gp and the negative lens group Gn becomes short during zooming from the maximum wide-angle state to the maximum telephoto state. Hence, the positive spherical aberration tends to become large closer to the maximum telephoto state because the on-axis light rays passing through the negative lens group Gn move away from the optical axis. Thus, it is desirable to form the negative lens group Gn with a positive lens component L2P (the fourth lens component L4) arranged on the object side and a negative lens component L2N (the fifth lens component L5) arranged on the image side. In this manner, the negative spherical aberration generated in the positive lens component L2P and the positive spherical aberrations generated in the negative lens component L2N offset each other and the fluctuation of the spherical aberration during zooming from the maximum wide-angle state to the maximum telephoto state may be controlled.

When zooming from the maximum wide-angle state to the maximum telephoto state, the height of the off-axis light rays passing through the negative lens group Gn approaches the optical axis, and it is desirable to control the fluctuation of the coma aberration during zooming from the maximum wide-angle state to the maximum telephoto state by making the object side surface of the positive lens component L2P aspherical in shape.

Furthermore, if plastic material is used for an objective lens, the plastic lens has the three problems described below:

1: The variation in refractive index of plastic material due to changing temperature is larger than glass material. Accordingly, the position of the image plane changes with changes in the temperature.

2: The variation of shape change index of plastic material due to changing temperature is larger than glass material. Accordingly, the refractive power and aberration easily change with changes in temperature.

3: Plastic discolors with the absorption of ultraviolet rays.

Thus, according to preferred embodiments, it is desirable to include two pieces of plastic lenses having relatively weak refractive power. In other words, the change in image position due to temperature change (problem 1 above) may be reduced by arranging a negative plastic lens (the second lens component L2) in the positive lens group Gp and a positive plastic lens (the fourth lens component L4) in the negative lens group Gn.

If the plastic lens has a biconvex shape or a biconcave shape, the curvature of the surfaces on both sides becomes large due to swelling of the volume during an increase in temperature. Conversely, the curvature of the surfaces on both sides becomes small due to shrinking of the volume during a decrease in temperature. As a result, fluctuation of the refractive power and fluctuation of the aberration relative to temperature change become large.

On the other hand, if the plastic lens has a meniscus shape and if the curvature of the surface on one side becomes large in positive during temperature change, the curvature of the surface on the other side becomes large in negative. As a result, the fluctuation of refractive power and the fluctuation of aberration due to temperature change may be controlled.

Therefore, it is desirable to make the plastic lens meniscus shaped to control the fluctuation of the refractive power and the fluctuation of the aberration due to temperature change (problem 2 above).

Moreover, discoloring of the lens caused by absorption of ultraviolet rays (problem 3 above) may be avoided by making the first lens component L1 a glass lens and thus preventing ultraviolet rays from transmitting beyond the first lens component L1 towards the image side.

As explained above, by arranging the aspherical surface in the negative subgroup, positive distortion may be favorably corrected, but because plastic material is moldable at lower temperatures than glass, plastic material is more advantageous in terms of reducing costs. Hence, it is more desirable to implement an aspherical surface to the second lens component L2 and, because the object side surface is farther away from the diaphragm, implementation of an aspherical surface to the object side surface results in the better correction of positive distortion.

In the example disclosed in Japanese Laid-Open Patent Publication No. 5-257063 described above, some similar methods are employed to resolve problems 1–3. However, the first lens component L1 has a biconvex surface facing the object side, which does not contribute to the correction of positive distortion. Moreover, the refractive power of the first lens component L1 is weak; hence, the first lens component L1 is arranged only for the purpose of avoiding discoloration caused by the absorption of the ultraviolet rays (problem 3) and is not actively utilized for aberration correction.

The preferred embodiments of the invention aim to improve performance and reduce the number of the lenses in the system by actively utilizing the first lens component L1 for aberration correction.

Hereafter, conditional formulae applicable to preferred embodiments of the invention will be described.

The zoom optical system preferably satisfies the conditional formula (1) below:

$$-0.7 < (r1-r2)/(r1+r2) < -0.1 \qquad (1)$$

where, r1 is the radius of curvature of the object side surface of the first lens component L1, and r2 is the radius of curvature of the image side surface of the first lens component L1.

The conditional formula (1) defines a bending shape of the first lens component L1 and aims to balance between the positive distortion and the coma aberration fluctuation caused by the field angle at the maximum wide-angle state. If the upper limit value of the conditional formula (1) is exceeded, the diversion operation of the first lens component L1 weakens, and the positive distortion generated in the positive lens group Gp at the maximum wide-angle state cannot be controlled. Moreover, the backfocus becomes short, which causes the separation of off-axis light rays passing through the negative lens group Gn from the optical axis; hence, the positive distortion for the entire lens system cannot be corrected. Conversely, if the lower limit value of the conditional formula (1) is not reached, the diversion operation of the first lens component L1 is strengthened and the positive distortion is favorably corrected. However, because the object side surface of the first lens component L1 has a concave surface with an extremely large curvature facing the object side, the fluctuation of coma aberration due to the field angle at the maximum wide-angle state cannot be favorably controlled.

In order to achieve even better imaging performance, it is desirable to provide an aspherical surface in the negative lens group Gn. In particular, it is desirable to make the surface closest to the object in the negative lens group Gn aspherical. In the negative lens group Gn, the difference between passing on-axis light rays and off-axis light rays is large. Hence by providing an aspherical surface in the negative lens group Gn, even better imaging performance is achieved while the system is made smaller in size and is capable of viewing a wider angle.

As described above, in order to favorably correct positive spherical aberration which is generated in the negative lens group Gn, it is desirable to form the negative lens group Gn with a positive lens component L2P (fourth lens component L4) to be arranged on the object side and with a negative lens component L2N (fifth lens component L5) to be arranged on the image side.

Additionally, as described above, the plastic material has a large refractive index fluctuation associated with temperature change. Hence, in the case where only one plastic lens is arranged in the lens system, the refractive power of the plastic lens preferably should be nearly zero, which makes it difficult to improve the performance and zooming capability of the lens system. In order to achieve high performance and cost reduction while controlling the fluctuation of the image plane position associated with temperature change, it is desirable to make the lens component L2P a plastic lens.

Conditional formulas (2) and (3) also may preferably be satisfied as follows:

$$0.6 < f3/fp < 0.95 \qquad (2)$$

$$0.12 < d4/fp < 0.25 \qquad (3)$$

where, f3 is the focal length of the third lens component L3, fp is the focal length of the positive lens group Gp and d4 is the on-axis distance between the second lens component L2 and the third lens component L3.

Conditional formula (2) defines the focal length of the third lens component L3. If the upper limit value of conditional formula (2) is exceeded, the focal length of the third lens component L3 becomes large in positive and the combined focal length of the first lens component L1 and the second lens component L2 become large in negative. As a result, it becomes impossible to sufficiently generate negative distortion in the positive lens group Gp and to satisfactorily control positive distortion at the maximum wide-angle state. Conversely, if the lower limit value of conditional formula (2) is not reached, the focal length of the third lens component L3 becomes too small in positive, and negative spherical aberration generated in the lens component L3 cannot be corrected.

Conditional formula (3) defines an on-axis distance between the second lens component L2 and the third lens component L3. If the upper limit value of conditional formula (3) is exceeded, the on-axis distance between the second lens component L2 and the third lens component L3 increases substantially, which causes the separation of the height of the off-axis light rays passing through the first lens component L1 and the second lens component L2 from the optical axis. Hence the on-axis aberration and the off-axis aberration may be corrected independently. However, with the on-axis light rays passing through the third lens component L3 away from the optical axis, the negative spherical aberration generated in the third lens component L3 cannot be corrected. Conversely, if the lower limit value of conditional formula (3) is not reached, the height of the off-axis light rays passing through the first lens component L1 and the second lens component L2 approaches the optical axis. Hence on-axis aberrations and off-axis aberrations cannot be corrected independently. Moreover, the fluctuation of coma aberration due to field angle cannot be controlled.

By introducing even more aspherical surfaces in the lens system to favorably correct spherical aberration which is generated in each lens group, it becomes possible to make the diameter of the lens system larger.

By decentering all or part of certain lens groups relative to the optical axis, it becomes possible to shift the image. In this case, it is clear that the anti-vibration effect that corrects the fluctuation of image position caused by vibration and the like of the lens system is achieved by combining, for example, an angular velocity sensor to detect vibration of the lens system and a driving member to execute decentering drive of all or part of the lens group according to vibration of the lens system.

BRIEF DESCRIPTION OF THE DRAWINGS

These and other aspects and advantages of the invention will become apparent from the following detailed description of preferred embodiments when taken in conjunction with the accompanying drawings, in which:

FIGS. 4(a)-4(d) are graphs that show spherical aberration, astigmatism, distortion, and coma aberration, respectively, at an intermediate focal length state according to the first embodiment;

FIGS. 7(a)-7(d) are graphs that show spherical aberration, astigmatism, distortion, and coma aberration, respectively, at the maximum wide-angle state according to the second embodiment;

FIGS. 9(a)-9(d) are graphs that show spherical aberration, astigmatism, distortion and coma aberration, respectively, at the maximum telephoto state according to the second embodiment;

FIGS. 11(a)-11(d) are graphs that show spherical aberration, astigmatism, distortion, and coma aberration, respectively, at the maximum wide-angle state according to the third embodiment;

FIG. 12(a)-12(d) are graphs that show spherical aberration, astigmatism, distortion, and coma aberration respectively, at an intermediate focal length state according to the third embodiment; and FIGS. 13(a)-13(d) are graphs that show spherical aberration, astigmatism, distortion, and coma aberration, respectively, at the maximum telephoto state according to the third embodiment.

DETAILED DESCRIPTION OF PREFERRED EMBODIMENTS

Figure 1:
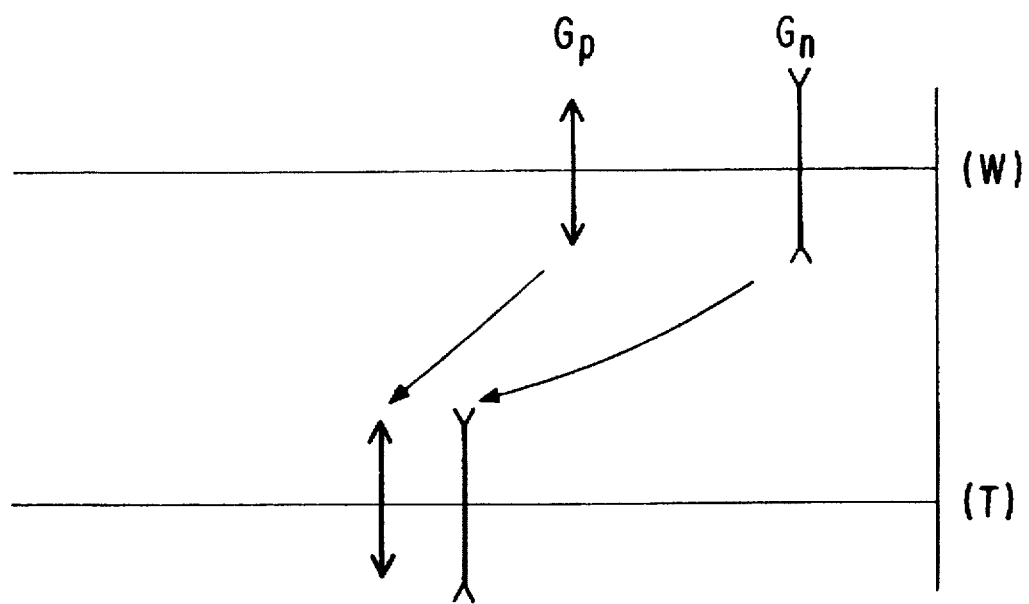
FIG. 1 shows the refractive power arrangement of the zoom optical system and conditions of movement of each lens group from the maximum wide-angle state (W) to the maximum telephoto state (T) according to a first embodiment of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

FIG. 1 shows the refractive power arrangement of the zoom optical system and conditions of the movement of each lens group during zooming from the maximum wide-angle state (W) to the maximum telephoto state (T).

The zoom optical system of each embodiment of the invention comprises a positive lens group Gp having a positive refractive power and a negative lens group Gn having a negative refractive power that is arranged on the image side of the positive lens group Gp. Each lens group moves towards the object side and a distance between the positive lens group Gp and the negative lens group Gn decreases during zooming from the maximum wide-angle state to the maximum telephoto state.

The aspherical surfaces are expressed by the following formula (a) where y denotes the height in a direction perpendicular to the optical axis; S(y) denotes the displacement in the direction of the optical axis at height y; R denotes the reference radius of curvature; κ denotes the conical coefficient; and Cn denotes the nth degree aspherical surface coefficient.

$$S(y)=(y^2/R)/[1_8+(1-\kappa \cdot y^2/R^2)^{1/2}]+C_4 \cdot y^4+C_6 \cdot y^6+C_8 \cdot y^8+C_{10} \cdot y^{10}+\ldots \quad (a)$$

In the ensuing Tables, the aspherical surfaces of each embodiment are marked with the symbol * to the right of the surface number.

Figure 2:
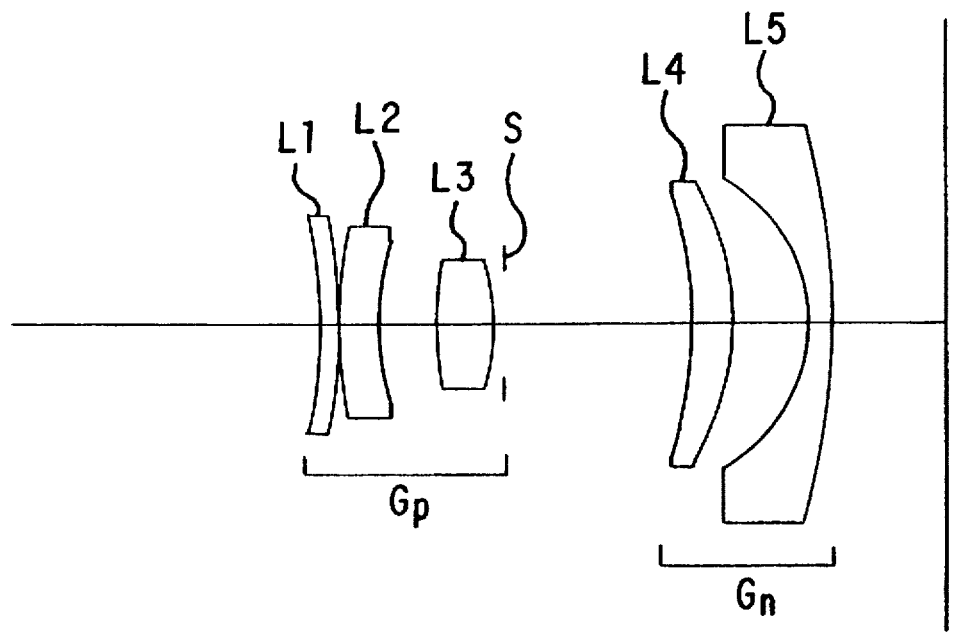
FIG. 2 is a schematic side view of a lens structure of the zoom optical system according to a first embodiment.
Figures 3A, 3B, 3C:
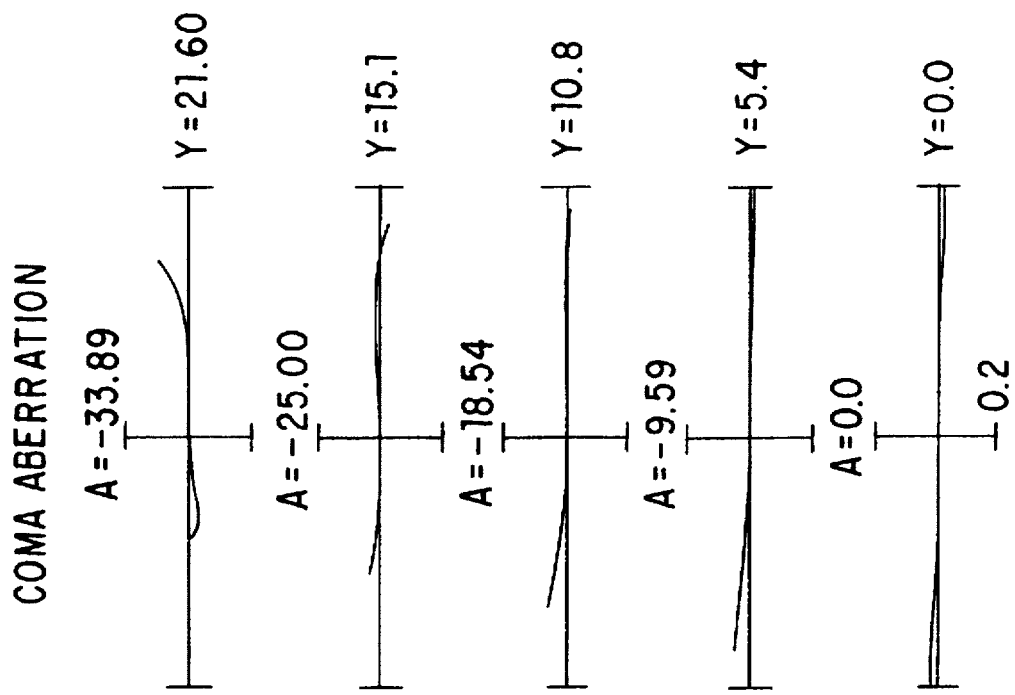
FIGS. 3(a)–3(d) are graphs that show spherical aberration, astigmatism, distortion, and coma aberration respectively, at the maximum wide-angle state according to the first embodiment.
Figure 3D:
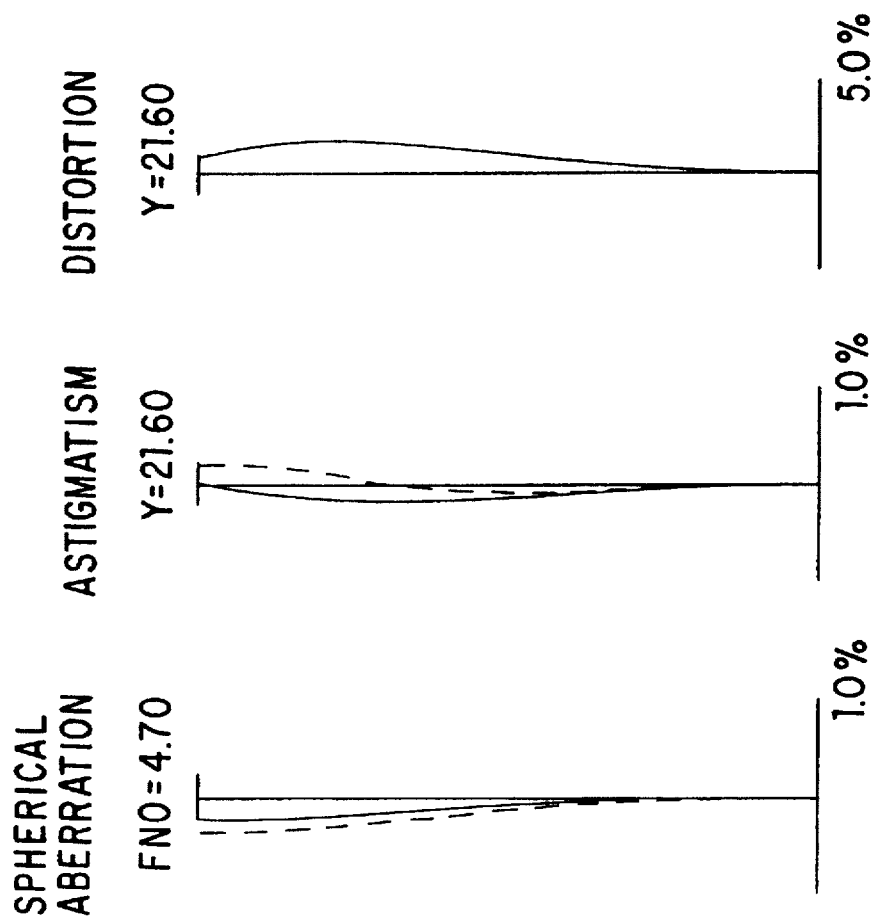
Figures 5A, 5B, 5C, 5D:
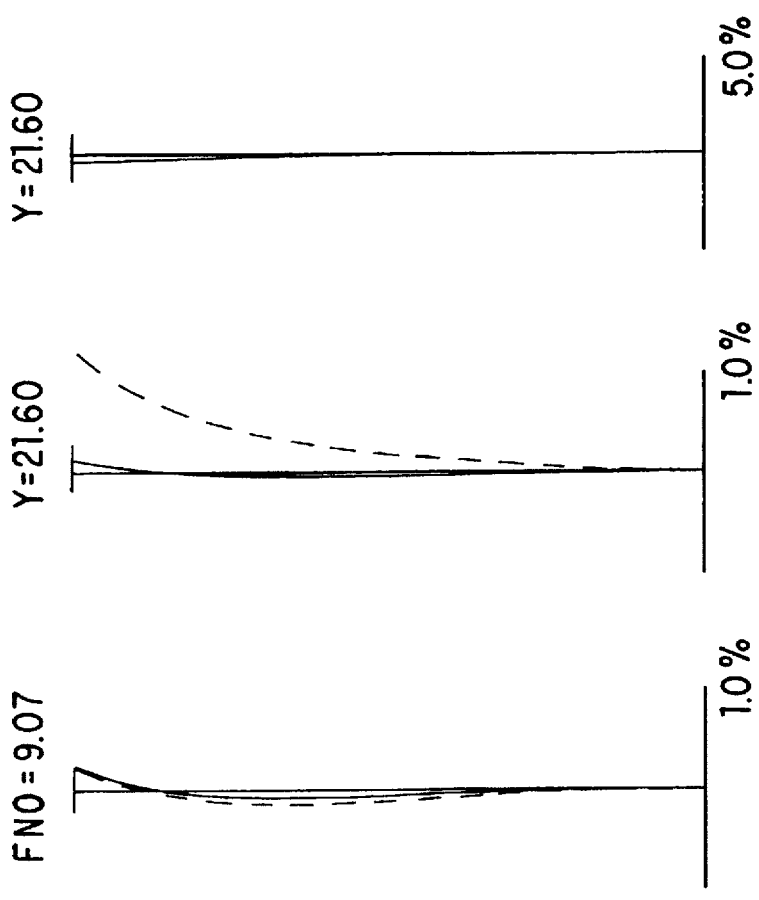
FIGS. 5(a)-5(d) are graphs that show spherical aberration, astigmatism, distortion, and coma aberration, respectively, at the maximum telephoto state according to the first embodiment.

FIG. 2 is a schematic side view of a lens structure of the zoom optical system according to the first embodiment of the invention.

The zoom optical system of FIG. 2 comprises, in order from the object side: a positive lens group Gp having a negative meniscus lens L1 with a concave surface facing the object side, a negative meniscus lens L2 with a convex surface facing the object side, and a biconvex lens L3; and a negative lens group Gn having a positive meniscus lens L4 with a concave surface facing the object side and a negative meniscus lens L5 with a concave surface facing the object side.

A diaphragm S is arranged between the positive lens group Gp and the negative lens group Gn. The diaphragm S moves as one unit with the positive lens group Gp during zooming from the maximum wide-angle state to the maximum telephoto state.

FIG. 2 shows the positional relationship of each lens group at the maximum wide-angle state. Each lens group moves on the optical axis along the zoom path indicated by the arrow in FIG. 1 during zooming from the maximum wide-angle state to the maximum telephoto state.

Values of various dimensions of the first embodiment of the invention are listed below and in Table 1. In the ensuing data, f denotes the focal length, FNO denotes F-number, 2ω denotes field angle, R denotes object distance, and Bf denotes back focus. The surface number is the order of the lens surface from the object side along the direction of the advancement of the light rays, and the values of refraction index and the Abbe's number are relative to the d-line (λ=587.6 nm).

TABLE 1

| F = 31.9 ~ 45.00 ~ 60.6 mm |||||
| FNO = 4.7 ~ 6.7 ~ 9.0 |||||
| 2ω = 67.8 ~ 51.2 ~ 39.3 |||||
| Surface Number | Radius of Curvature | Intersurface Distance | Abbe Number | Refractive Index |
| --- | --- | --- | --- | --- |
| 1 | −31.5999 | 1.25 | 1.75520 | 27.6 |
| 2 | −52.0091 | 0.13 | | |
| 3* | 24.7192 | 2.50 | 1.58518 | 30.2 (polycarbonate) |
| 4 | 21.1132 | 3.75 | | |
| 5 | 71.6442 | 3.75 | 1.51680 | 64.1 |
| 6 | −11.5045 | 0.50 | | |
| 7 | ∞ | (d7 = variable) | (aperture diaphragm S) ||
| 8* | −23.9283 | 2.50 | 1.58518 | 30.2 (polycarbonate) |
| 9 | −19.0291 | 5.00 | | |
| 10 | −11.5227 | 1.50 | 1.72000 | 50.2 |
| 11 | −50.8983 | (Bf) | | |

Aspherical Surface Data:

| | R | K | C_4 |
| --- | --- | --- | --- |
| Surface 3: | 24.7192 | 1.0000 | −0.15067 × 10⁻³ |
| | C_6 | C_8 | C_10 |
| | −0.66572 × 10⁻⁶ | −0.3153 × 10⁻⁷ | 0.20483 × 10⁻⁹ |

TABLE 1-continued

F = 31.9 ~ 45.00 ~ 60.6 mm
FNO = 4.7 ~ 6.7 ~ 9.0
2ω = 67.8 ~ 51.2 ~ 39.3

| Surface Number | Radius of Curvature | Intersurface Distance | Abbe Number | Refractive Index |
|---|---|---|---|---|
| | $R$ | $K$ | $C_4$ | |
| Surface 8: | −23.9283 | 1.000 | $0.47425 \times 10^{-4}$ | |
| | $C_6$ | $C_8$ | $C_{10}$ | |
| | $-0.70025 \times 10^{-6}$ | $0.20154 \times 10^{-7}$ | $-0.12378 \times 10^{-9}$ | |

Variable Distance During Zooming Or Focusing Conditions:

| f | 31.8852 | 45.0084 | 60.6260 |
|---|---|---|---|
| d7 | 12.0230 | 6.6477 | 3.2833 |
| Bf | 7.4323 | 21.2242 | 37.6376 |

Condition Corresponding Values:

fp = 23.650
f3 = 19.480
(1) (r1 − r2)/(r1 + r2) = −0.244
(2) f3/fp = 0.823
(3) d4/fp = 0.159

FIGS. 3(a) through 5(d) are graphs showing various aberrations of the first embodiment. FIGS. 3(a)–3(d) show various aberrations at the maximum wide-angle state.

FIGS. 4(a)–4(d) show various aberrations at the medium focal length distance. FIGS. 5(a)–5(d) show various aberrations at the maximum telephoto state.

In each aberration graph, FNO denotes F-number, Y denotes the image height and A denotes the field angle relative to each image height, respectively. In the aberration graphs showing astigmatism, the solid line represents the sagittal image plane and the broken line represents the meridional image plane. Furthermore, in the aberration graph showing spherical aberration, the broken line represents the sine condition. Each aberration graph clearly indicates that the various aberrations are favorably corrected at each focus length condition of the first embodiment.

Figure 6:
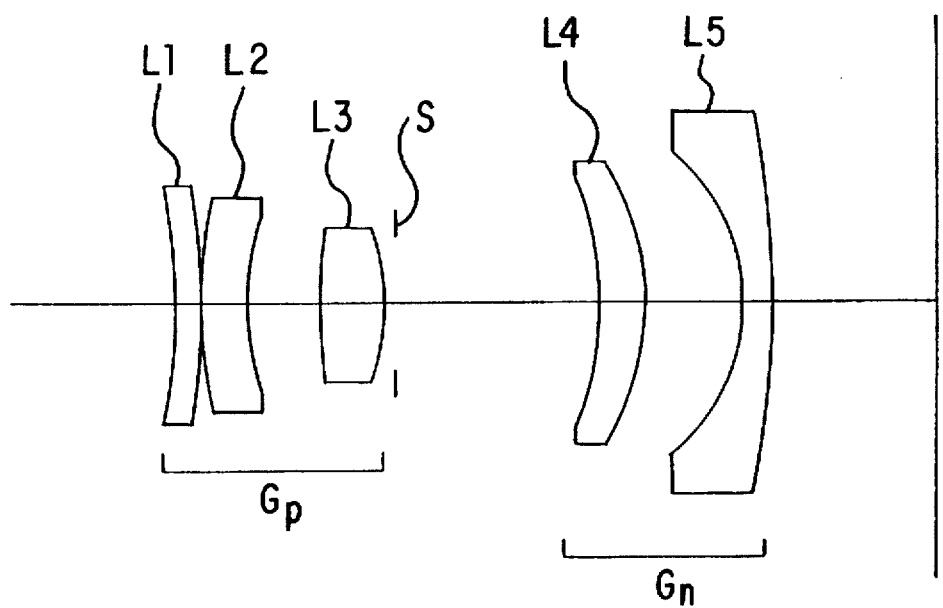
FIG. 6 is a schematic side view of a lens structure of the zoom optical system according to a second embodiment.
Figures 8A, 8B, 8C:
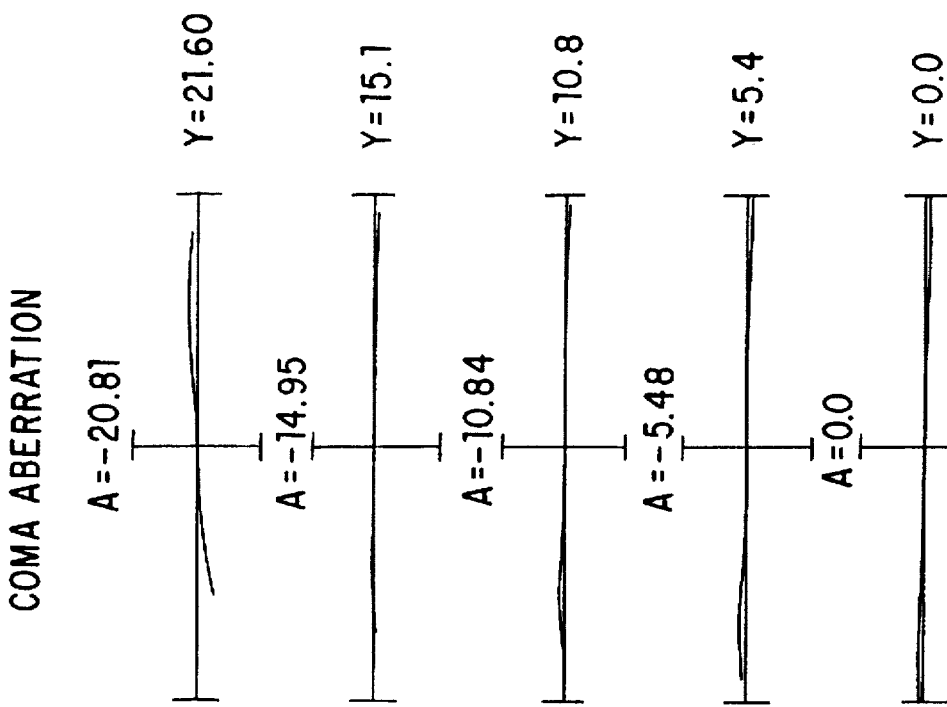
FIGS. 8(a)-8(d) are graphs that show spherical aberration, astigmatism, distortion and coma aberration, respectively, at an intermediate focal length state according to the second embodiment.
Figure 8D:
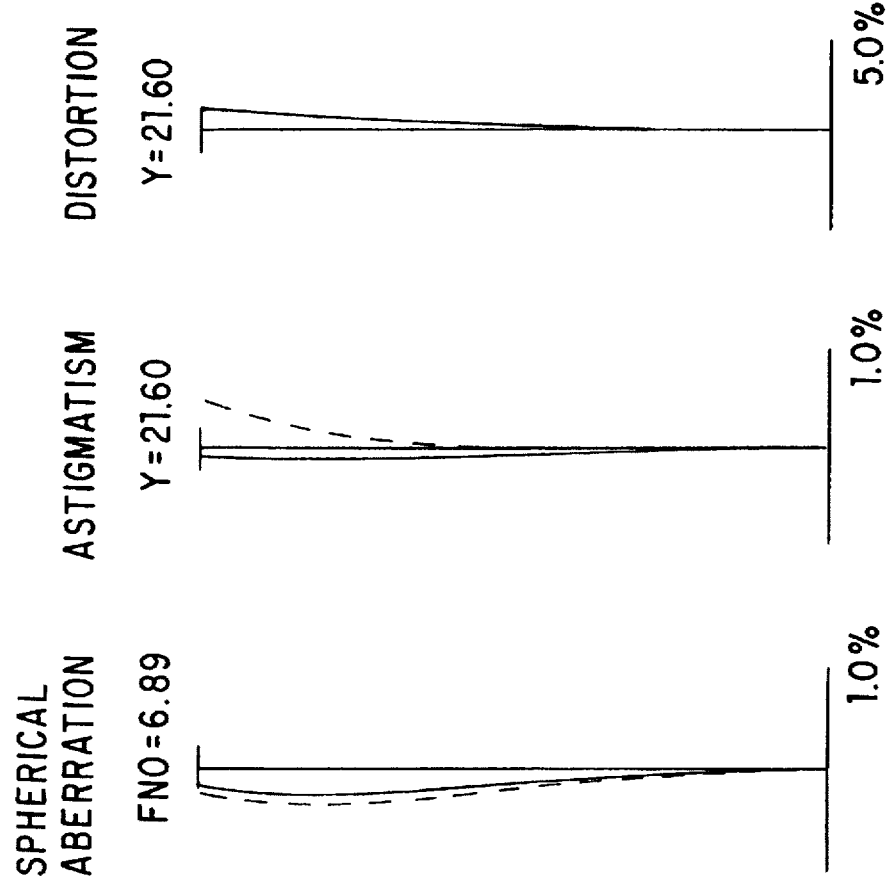

FIG. 6 is a schematic side view of a lens structure of the zoom optical system according to the second embodiment of the invention.

The zoom optical system of FIG. 6 comprises, in order from the object side: a positive lens group Gp having a negative meniscus lens L1 with a concave surface facing the object side, a negative meniscus lens L2 with a convex surface facing the object side, and a biconvex lens L3; and a negative lens group Gn having a positive meniscus lens L4 with a concave surface facing the object side and a negative meniscus lens L5 with a concave surface facing the object side.

As with the first embodiment, a diaphragm S is arranged between the positive lens group Gp and the negative lens group Gn. The diaphragm S moves as one unit with the positive lens group Gp during zooming from the maximum wide-angle state to the maximum telephoto state.

FIG. 6 shows the positional relationship of each lens group at the maximum wide-angle state. Each lens group moves on the optical axis along the zoom path indicated by the arrow in FIG. 1 during zooming from the maximum wide-angle state to the maximum telephoto state.

Values of various dimensions of the second embodiment of the invention are listed below and in Table 2. In the ensuing data, f denotes focal length, FNO denotes F-number, 2ω denotes field angle, R denotes the object distance, and Bf denotes the back focus. The surface number is the order of the lens surface from the object side along the direction of the advancement of the light rays, and the values of refraction index and the Abbe's number are relative to the d-line (λ=587.6 nm).

TABLE 2 f = 38.6 ~ 56.3 ~ 73.1 mm
FNO = 4.8 ~ 6.9 ~ 9.0
2ω = 55.9 ~ 41.6 ~ 32.9

| Surface Number | Radius of Curvature | Intersurface Distance | Abbe Number | Refractive Index |
|---|---|---|---|---|
| 1 | −39.3500 | 1.50 | 1.75520 | 27.6 |
| 2 | −101.3413 | 0.15 | | |
| 3* | 26.4436 | 3.00 | 1.58518 | 30.2 (polycarbonate) |
| 4 | 21.3298 | 4.50 | | |
| 5 | 37.7573 | 4.50 | 1.51680 | 64.1 |
| 6 | −14.7141 | 0.50 | | |
| 7 | ∞ | (d7 = variable) | (aperture diaphragm S) | |
| 8 | −23.9406 | 3.00 | 1.58518 | 30.2 (polycarbonate) |
| 9 | −16.8925 | 6.00 | | |
| 10 | −13.6127 | 1.8 | 1.79631 | 40.9 |
| 11 | −79.7495 | (Bf) | | |

Aspherical Surface Data:

| | $R$ | $K$ | $C_4$ |
|---|---|---|---|
| Surface 3: | 26.4436 | 1.0000 | $-0.82867 \times 10^{-4}$ |
| | $C_6$ | $C_8$ | $C_{10}$ |
| | $-0.46629 \times 10^{-6}$ | $-0.58074 \times 10^{-8}$ | $0.23495 \times 10^{-10}$ |

Variable Distance During Zooming Or Focusing Conditions:

| f | 38.6311 | 56.2521 | 73.1193 |
|---|---|---|---|
| d7 | 13.2383 | 6.8214 | 3.5762 |
| Bf | 10.5872 | 28.6943 | 46.0268 |

Condition Corresponding Values:

fp = 27.751
f3 = 21.104
(1) (r1 − r2)/(r1 + r2) = −0.441
(2) f3/fp = 0.760
(3) d4/fp = 0.162

FIGS. 7(a) through 9(d) are graphs showing various aberrations of the second embodiment. FIGS. 7(a)–(d) show various aberrations at the maximum wide-angle state. FIG. 8(a)–8(d) show various aberrations at the medium focal length distance. FIGS. 9(a)–9(d) show various aberrations at the maximum telephoto state.

In each aberration graph, FNO denotes F-number, Y denotes the image height and A denotes the field angle relative to each image height, respectively. In the aberration graphs showing the astigmatism, the solid line represents sagittal image plane and the broken line represents the meridional image plane. Furthermore, in the aberration graph showing spherical aberration, the broken line represents the sine condition. Each aberration graph clearly indicates that the various aberrations are favorably corrected at each focus length condition of the second embodiment.

Figure 10:
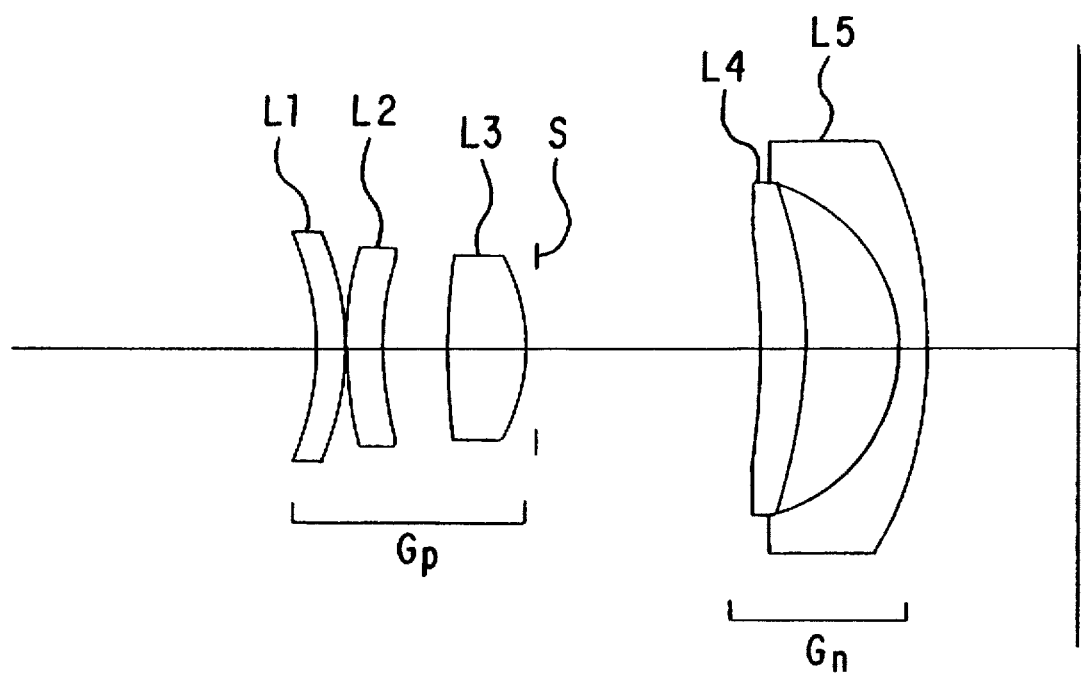
FIG. 10 is a schematic side view of a lens structure of the zoom optical system according to a third embodiment.

FIG. 10 is a schematic side view of a lens structure of the zoom optical system according to the third embodiment of the invention.

The zoom optical system of FIG. 10 comprises, in order from the object side: a positive lens group Gp having a negative meniscus lens L1 with a concave surface facing the object side, a negative meniscus lens L2 with a convex surface facing the object side, and a biconvex lens L3; and a negative lens group Gn having a positive meniscus lens L4 with a concave surface facing the object side and a negative meniscus lens L5 with a concave surface facing the object side.

A diaphragm S is arranged between the positive lens group Gp and the negative lens group Gn. The diaphragm S moves as one unit with the positive lens group Gp during zooming from the maximum wide-angle state to the maximum telephoto state.

FIG. 10 shows the positional relationship of each lens group at the maximum wide-angle state. Each lens group moves on the optical axis along the zoom path indicated by the arrow in FIG. 1 during zooming from the maximum wide-angle state to the maximum telephoto state.

Values of various dimensions of the third embodiment of the invention are listed below and in Table 3. In the ensuing data, f denotes focal length, FNO denotes F-number, 2ω denotes field angle, R denotes the object distance, and Bf denotes back focus. The surface number is the order of the lens surface from the object side along the direction of the advancement of the light rays, and the values of refraction index and the Abbe's number are relative to the d-line (λ=587.6 nm).

TABLE 3 f = 38.8 ~ 62.8 ~ 98.0 mm
FNO = 4.0 ~ 6.4 ~ 10.0
2ω = 58.9 ~ 38.2 ~ 25.0

| Surface Number | Radius of Curvature | Intersurface Distance | Abbe Number | Refractive Index |
|---|---|---|---|---|
| 1 | −20.1829 | 1.88 | 1.86074 | 23.0 |
| 2 | −22.4096 | 0.13 | | |
| 3* | 29.9601 | 2.26 | 1.58518 | 30.2 (polycarbonate) |
| 4 | 20.3638 | 4.40 | | |
| 5 | 90.0185 | 5.03 | 1.48749 | 70.4 |
| 6 | −12.5711 | 0.50 | | |
| 7 | ∞ | (d7 = variable) | (aperture diaphragm S) | |
| 8* | −36.6064 | 3.02 | 1.58518 | 30.2 (polycarbonate) |
| 9 | −29.0312 | 5.78 | | |
| 10 | −11.4707 | 1.81 | 1.78797 | 47.5 |
| 11 | −30.6941 | (Bf) | | |

Aspherical Surface Data:

| | R | K | $C_4$ |
|---|---|---|---|
| Surface 3: | 29.9601 | 1.0000 | −9.79345 × 10⁻⁵ |
| | $C_6$ | $C_8$ | $C_{10}$ |
| | −4.46452 × 10⁻⁷ | −1.05520 × 10⁻⁸ | 4.99894 × 10⁻¹¹ |
| | R | K | $C_4$ |
| Surface 8: | −36.6064 | 1.000 | 4.80795 × 10⁻⁵ |
| | $C_6$ | $C_8$ | $C_{10}$ |
| | −2.12523 × 10⁻⁷ | 1.62692 × 10⁻⁹ | −1.53185 × 10⁻¹² |

Variable Distance During Zooming Or Focusing Conditions:

| f | 38.8186 | 62.8123 | 97.9851 |
|---|---|---|---|
| d7 | 14.6093 | 7.2634 | 2.9973 |
| Bf | 9.5284 | 33.4025 | 68.3999 |

Condition Corresponding Values fp = 27.390
f3 = 22.997
(1) (r1 − r2)/(r1 + r2) = −0.523
(2) f3/fp = 0.840
(3) d4/fp = 0.161

FIGS. 11(a) through 13(d) are graphs showing various aberrations of the third embodiment. FIGS. 11(a)–11(d) shows various aberrations at the maximum wide-angle state. FIGS. 12(a)–12(d) show various aberrations at the medium focal length distance. FIGS. 13(a)–13(d) show various aberrations at the maximum telephoto state.

In each aberration graph, FNO denotes the F-number, Y denotes the image height and A denotes the field angle relative to each image height, respectively. In the aberration graphs showing the astigmatism, the solid line represents sagittal image plane and the broken line represents the meridional image plane. Furthermore, in the aberration graphs showing spherical aberration, the broken line represents the sine condition. Each aberration graph clearly indicates that various aberrations are favorably corrected at each focus length condition of the third embodiment.

In the embodiments of the invention described above, a small, high performance zoom optical system that has a simple structure with a zoom ratio exceeding 200 percent is achieved.

While the invention had been described in conjunction with preferred embodiments thereof, it is evident that many alternatives, modifications and variations may be apparent to those skilled in the art. Accordingly, it is intended to embrace all alternatives, modifications and variations which may fall within the spirit and broad scope of the appended claims.

What is claimed is:

1. A zoom optical system comprising:

a positive lens group having a positive refractive power, the positive lens group comprising, in order from an object side toward an image side, a first lens component having a negative refractive power, a plastic second lens component having a negative refractive power, and a glass third lens component having a positive refractive power, the first lens component including a meniscus-shaped lens having a concave surface facing the object side; and a negative lens group having a negative refractive power and that is arranged on the image side of the positive lens group, the negative lens group comprising, in order from the object side, a plastic fourth lens component having a positive refractive power and a fifth lens component having a negative refractive power;

the focal length of the zoom optical system is changed by changing the distance between the positive lens group and the negative lens group.

2. The zoom optical system according to claim 1, wherein the conditions:

$$-0.7 < (r1-r2)/(r1+r2) < -0.1$$

are satisfied, where r1 is a radius of curvature of an object side surface of the first lens component and r2 is a radius of curvature of an image side surface of the first lens component.

3. The zoom optical system according to claim 1, wherein at least an object side of the second lens component is formed as an aspherical surface.

4. The zoom optical system according to claim 2, wherein at least an object side of the second lens component is formed as an aspherical surface.

5. The zoom optical system according to claim 1, wherein the conditions:

$$0.6 < f3/fp < 0.95$$

and $$0.12 < d4/fp < 0.25$$

are satisfied where, f3 is a focal length of the third lens component, fp is a focal length of the positive lens group, and d4 is a distance between the second lens component and the third lens component along an optical axis of the system.

6. The zoom optical system according to claim 2, wherein the conditions:

$$0.6 < f3/fp < 0.95$$

and $$0.12 < d4/fp < 0.25$$

are satisfied where, f3 is a focal length of the third lens component, fp is a focal length of the positive lens group, and d4 is a distance between the second lens component and the third lens component along an optical axis of the system.

7. The zoom optical system according to claim 3, wherein the conditions:

$$0.6 < f3/fp < 0.95$$

and $$0.12 < d4/fp < 0.25$$

are satisfied where, f3 is a focal length of the third lens component, fp is a focal length of the positive lens group, and d4 is a distance between the second lens component and the third lens component along an optical axis of the system.

8. The zoom optical system according to claim 1, wherein the positive lens group consists essentially of the first, second and third lenses.

9. A method of structuring a zoom optical system, comprising:

providing a positive lens group having a positive refractive power, the positive lens group comprising, in order from an object side to an image side, a first lens component having a negative refractive power, a plastic second lens component having a negative refractive power and a glass third lens component having a positive refractive power, the first lens component having a meniscus shape and a concave surface facing the object side; and providing a negative lens group having a negative refractive power on an image side of the positive lens group, the negative lens group comprising, in order from the object side, a plastic fourth lens component having a positive refractive power and a fifth lens component having a negative refractive power.

10. The method according to claim 9, wherein the first lens component is structured such that the conditions:

$$-0.7 < (r1-r2)/(r1+r2) < -0.1$$

are satisfied, where r1 is a radius of curvature of an object side surface of the first lens component and r2 is a radius of curvature of an image side surface of the first lens component.

11. The method according to claim 9, further comprising forming at least an object side of the second lens component as an aspherical surface.

12. The method according to claim 11, wherein the zoom optical system is further structured such that the conditions:

$$0.6 < f3/fp < 0.95$$

and $$0.12 < d4/fp < 0.25$$

are satisfied, where f3 is a focal length of the third lens component, fp is a focal length of the positive lens group, and d4 is a distance between the second lens component and the third lens component along an optical axis of the system.

13. The method according to claim 11, wherein the step of providing a positive lens group includes providing the positive lens group consisting essentially of the first, second and third lens components.

14. A zoom optical system, comprising:

a positive lens group having a positive refractive power, the positive lens group including, in order from an object side toward an image side, a first lens component having a negative refractive power, a second lens component having a negative refractive power and a third lens component having a positive refractive power, the first lens component including a meniscus-shaped lens having a concave surface facing the object side, at least an object side of the second lens component being formed as an aspherical surface; and a negative lens group having a negative refractive power and that is arranged on the image side of the positive lens group, the negative lens group including, in order from the object side, a fourth lens component having a positive refractive power and a fifth lens component having a negative refractive power;

the positive lens group and the negative lens group being movable relative to each other to execute zooming by changing a distance between the positive lens group and the negative lens group;

the first lens component satisfying the conditions:

$$-0.7 < (r1-r2)/(r1+r2) < -0.1,$$

where r1 is a radius of curvature of an object side surface of the first lens component and r2 is a radius of curvature of an image side surface of the first lens component;

and the second lens component and the fourth lens component being plastic lenses.

15. A zoom optical system, comprising:

a positive lens group having a positive refractive power, the positive lens group comprising, in order from an object side toward an image side, a first lens component having a negative refractive power, a second lens component having a negative refractive power and a third lens component having a positive refractive power, the first lens component including a meniscus-shaped lens having a concave surface facing the object side, at least an object side of the second lens component is formed as an aspherical surface and at least the third lens component is formed by only spherical surfaces; and a negative lens group having a negative refractive power and that is arranged on the image side of the positive lens group, the negative lens group comprising, in order from the objective side, a plastic fourth lens component having a positive refractive power and a fifth lens component having a negative refractive power;

the focal length of the zoom optical system is changed by changing a distance between the positive lens group and the negative lens group.

16. A zoom optical system, comprising:

a positive lens group having a positive refractive power, the positive lens group comprising, in order from an object side toward an image side, a first lens component having a negative refractive power, a second lens component having a negative refractive power and a third lens component having a positive refractive power, the first lens component including a meniscus-shaped lens having a concave surface facing the object side; and a negative lens group having a negative refractive power and that is arranged on the image side of the positive lens group;

the focal length of the zoom optical system is changed by changing a distance between the positive lens group and the negative lens group;

wherein the zoom optical system satisfies the conditions:

$0.6 < f3/fp < 0.95$;

and $0.12 < d4/fp < 0.25$ where:

f3 is a focal length of the third lens component;

fp is a focal length of the positive lens group; and d4 is a distance between the second lens component and the third lens component along an optical axis of the system.

17. A method of structuring a zoom optical system, comprising:

providing a positive lens group having a positive refractive power, the positive lens group comprising, in order from an object side to an image side, a first lens component having a negative refractive power, a second lens component having a negative refractive power and a third lens component having a positive refractive power, the first lens component having a meniscus shape and a concave surface facing the object side, at least an object side of the second lens component having an aspherical surface and at least the third lens component formed by only spherical surfaces; and providing a negative lens group having a negative refractive power on an image side of the positive lens group, the negative lens group comprising, in order from the object side, a plastic fourth lens component having a positive refractive power and a fifth lens component having a negative refractive power.

* * * * *